United States Patent
Stevens et al.

[11] 3,827,650
[45] Aug. 6, 1974

[54] TRUCK MOUNTED WRAPPER CABLE STORAGE MEANS

[76] Inventors: Ray C. Stevens, Box 173; Joe E. Stevens, Box 173, both of Kootenai, Idaho 83840

[22] Filed: Apr. 26, 1973

[21] Appl. No.: 354,903

[52] U.S. Cl. .................. 242/86.5 R, 242/107 R
[51] Int. Cl. ............................................ B65h 75/00
[58] Field of Search.... 242/107, 74, 86.5 R, 86.5 A, 242/86.52

[56] References Cited
UNITED STATES PATENTS

| | | | |
|---|---|---|---|
| 905,171 | 12/1908 | Gilcrest | 242/107.2 |
| 1,105,680 | 8/1914 | Mitchell | 242/107.5 |
| 1,260,340 | 3/1918 | Culver | 242/107.2 |
| 1,574,552 | 2/1926 | Chapman | 242/107 R |
| 2,828,089 | 3/1958 | Isenberger | 242/86.5 R |
| 3,478,980 | 11/1969 | Raasch | 242/86.52 |
| 3,494,570 | 2/1970 | Jones, Jr. | 242/86.5 A |
| 3,602,454 | 8/1971 | Leifheit | 242/107 R |

*Primary Examiner*—John W. Huckert
*Assistant Examiner*—Jon W. Henry
*Attorney, Agent, or Firm*—Clarence A. O'Brien & Harvey B. Jacobson

[57] ABSTRACT

A storage unit for wrapper cables, load binders or the like which are used to secure logs onto the load bed of a truck so that such cables or binders will be conveniently stored in a readily accessible position and in tangle free condition during periods when they are not in use such as when the truck is returning in empty condition for another load of logs. The storage unit includes a spring loaded drum assembly mounted on the bangboard of the truck at a convenient height to be reached by a person when standing on the ground.

2 Claims, 4 Drawing Figures

PATENTED AUG 6 1974
3,827,650
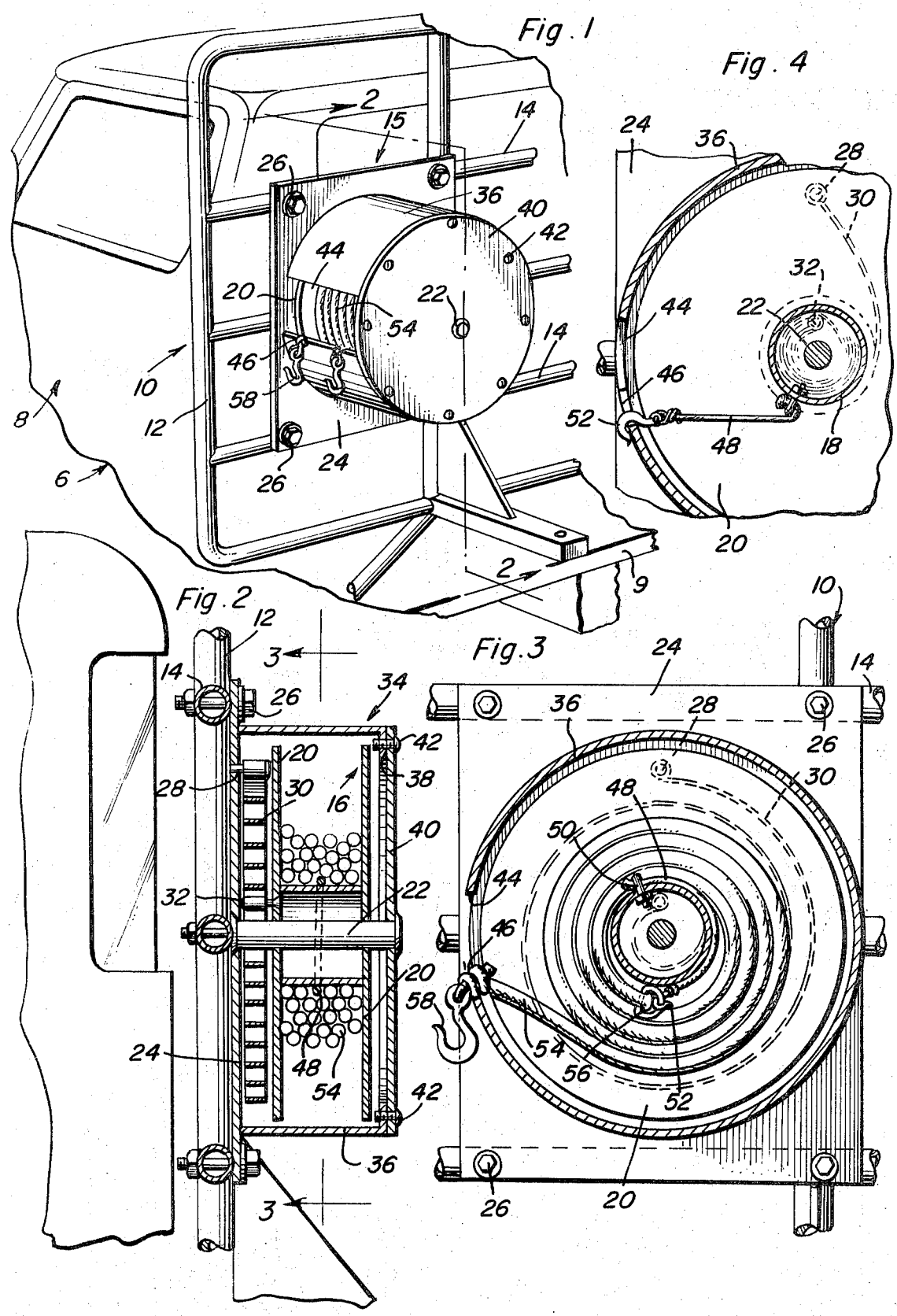

TRUCK MOUNTED WRAPPER CABLE STORAGE MEANS

BACKGROUND OF THE INVENTION

1. Field of the Invention

The present invention generally relates to a storage unit for flexible cables, load binders and the like when not in use in order to maintain them in a position and condition for use when desired to secure a load to a load bed on a truck or similar vehicle.

2. Description of the Prior Art

In securing loads to the load bed of a truck, various types of load binders, securing devices, cables and the like are employed. When hauling logs on a truck, most states require that at least two load binders be used in order to secure the logs in place on the load bed during transport. In the logging industry, such load binders are generally known as wrapper cables and are in the form of a flexible cable having a length generally ranging between 28 feet and 36 feet with a hook on one end and a D-ring on the other with these cables being used in a conventional and well known manner to secure the logs on the load bed. When the truck is unloaded, the wrapper cables are removed and, of course, must accompany the truck back to the loading site for subsequent use in binding a subsequent load of logs on the truck bed. In view of the length of these cables, they are frequently tangled, sometimes lost and otherwise present a considerable problem of storage during their period of nonuse when the truck is being driven back to the loading site.

Various procedures have been followed in securing such wrapper cables in stored position to the load bed but most techniques require a considerable expenditure of time in storing the cables and a further expenditure of time in arranging the cables in a position for loading a subsequent load of logs. While many previously patented devices have been provided for storing load lifting cables, electrical conductors, flexible hoses and tubes when they are not in use, such devices have not been used for storing wrapper cables, load binders and the like.

SUMMARY OF THE INVENTION

An object of the present invention is to provide a storage unit in the form of a spring wound reel or drum enclosed in a housing provided with a slot-like opening on which the wrapper cables are stored.

Another object of the invention is to provide a storage unit in accordance with the preceding object in which the drum is spring-biased in a direction to wind the wrapper cables onto the drum with both cables being simultaneously wound onto the drum.

Still another object of the invention is to provide a storage unit in accordance with the preceding objects in which the wrapper cables are connected with a short cable permanently secured to the hub of the drum which short cable includes a hook for engagement with the D-rings of the wrapper cables when they are connected therewith and for engagement with the notched edge portion of the housing when the wrapper cables are withdrawn from the drum thereby retaining the spring bias on the drum so that the spring bias will automatically rewind the wrapper cables onto the drum when reattached to the stub cable.

Yet another object of the invention is to provide a storage unit in accordance with the preceding objects which is quite simple in construction, mounted at a convenient height on the bangboard of a truck body and effective for storing two or more cables, load binders and the like.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS 30

FIG. 1 is a perspective view of the storage unit mounted on the bangboard of a truck.

FIG. 2 is a vertical sectional view, on an enlarged scale, taken generally along section line 2—2 of FIG. 1 illustrating the structural details of the storage unit.

FIG. 3 is a sectional view taken substantially upon a plane passing along section line 3—3 illustrating the wrapper cables wound onto the spring-biased drum.

FIG. 4 is a fragmental sectional view similar to FIG. 3 but illustrating the stub cable associated with the housing for retaining the spring-biased drum in spring-biased condition when the wrapper cables are not reeled thereon.

DESCRIPTION OF THE PREFERRED EMBODIMENT

Referring to the drawings, a logging truck is schematically illustrated and designated by numeral 6 which includes a cab 8 and a load bed 9. At the rear of the cab and at the forward end of the load bed 9, there is a bangboard 10 in the form of a generally rectangular tubular frame 12 which includes substantially horizontal and vertically spaced parallel members 14. This construction is conventional and the specific details of the truck, load bed and bangboard are conventional.

Conventionally, logs are retained on the load bed by at least two load binders or wrapper cables, the details of which will be described hereinafter and the present invention involves a storage unit for storing the wrapper cables when they are not in use such as when the truck is empty and returning to a log loading site.

The storage unit is generally designated by reference numeral 15 and includes a rotatable drum 16 incorporating a hollow hub 18 and spaced parallel discs 20 fixed to the hub 18. The drum 16 is mounted on a stub shaft 22 welded or otherwise rigidly fixed to a rectangular mounting plate 24. The plate 24 is bolted to the support members 14 by suitable fastening bolts 26.

The plate 24 receives an anchor pin or bolt 28 for one end of a spiral leaf spring 30 which has its other end 32 suitably anchored to the drum 16 in order to spring bias the drum in a predetermined direction in a manner and for a purpose described hereinafter. As illustrated, the spring 30 is disposed between one of the discs 20 and the plate 24 as illustrated in FIG. 2.

The spring 30 and the drum 16 are enclosed in a housing generally designated by numeral 34 which includes a cylindrical peripheral wall 36 having a flange 38 at its outer edge on which a circular cover plate 40 is mounted by suitable fasteners 42. Also, the wall 36 is provided with a slot 44 opening outwardly of the truck bed with the bottom edge of the slot 44 having at least two notches 46 therein which communicate with the bottom edge of the slot. Attached to the hollow hub 18 of the drum is a short stub cable 48 anchored to the hub 18 by a suitable clamp bolt 50 or the like and provided with a hook 52 on its outer end. The stub cable 48 is sufficiently long to reach from the periphery of the hub 18 to the notches 46 so that the hook 52 may be engaged with a notch 46 to retain the spring 30 in tightly wound condition as illustrated in FIG. 4. This orientation of the components is such that the storage unit is not in use and the tightly coiled or wound spring 30 is biasing the drum 16 in a counterclockwise direction as observed in FIG. 4 thus maintaining the cable 48 in a taut condition for maintaining the hook 52 engaged with one of the notches 46.

FIGS. 1-3 disclose two wrapper cables positioned on the drum 16. The wrapper cables are conventionally of a length of 28 feet to 36 feet provided with a D-ring 56 on one end and a hook 58 on the other. In most if not all areas, at least two wrapper cables or load binders 54 are required to secure and bind a load of logs to a truck bed when transporting the logs. When the logs are to be unloaded, the wrapper cables 54 are removed and are stored on the storage unit 15 when they are not in use. The D-rings 56 on the wrapper cables 54 are connected to the hook 52 on the short cable 48 attached to the drum 18 after the hook 52 has been manually disengaged from the notch 46. Inasmuch as the spring 30 was under tension, the spring 30 will then rotate the drum 16 as the two wrapper cables 54 are fed in through the slot 44 so that the cables 54 are wound onto the drum 16 to the position illustrated in FIG. 3. The hooks 58 on the end of the wrapper cables 54 are disposed exteriorly of the wall 36 with the enlargement of the wrapper cables where they are connected to the hooks 58 engaging in the notches 46 to prevent further winding of the wrapper cables 54 onto the drum. Thus, the cables are stored on the drum in a tangle-free spirally wound condition with the end hooks 58 exposed for ready access by a person standing on the ground alongside of the truck. When it is desired to remove the cables 54, they are both removed simultaneously by grasping the hooks 58 and pulling the wrapper cables 54 longitudinally thus unwinding them from the drum and rotating the drum in a clockwise direction as observed in FIG. 3 so that the spring 30 will be tensioned or tightly wound. When the D-rings are exposed at the slot, the hook 52 on the short cable 48 is grasped and the D-rings separated therefrom and the hook 52 then engaged with one of the notches 46.

It is pointed out that when longer logs or multiple length logs are hauled, such as when shorter logs are piled on top of longer logs, more than two wrapper cables are sometimes required. Thus, more than two notches and more than two wrapper cables may be stored on each drum or additional storage units may be provided. The storage unit may be employed on various types of trucks or other conveying vehicles and while it has been disclosed in combination with a log carrying truck and wrapper cables or load binders associated therewith, it is pointed out that the storage unit may be employed with trucks or other vehicles for carrying other types of loads in which flexible load binders are employed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a cab-equipped log hauling truck, a bangboard vertically and fixedly mounted on said truck rearwardly of and adjacent to the cab, a plurality of wrapper cables for encircling logs on the truck and securing such logs thereon, each wrapper cable having a hook at one end and a loop at the other, and means mounted on said bangboard adjacent an outer edge thereof and at a height accessible to a person standing on the ground for storing the cables when not in use and providing access to said cables for use when loading and securing logs on the truck, said means comprising a housing enclosing a drum, said drum including means for connecting the loop on each wrapper cable to the drum for winding the wrapper cables thereon, said housing including a substantially annular wall having a horizontal slot therein, said slot facing outwardly toward an edge of the bangboard to provide access thereto, said housing including an axle shaft, said shaft being horizontally disposed longitudinally of the truck, said drum having a hub portion, said hub portion mounted for rotation with respect to said shaft, spring means anchored to said hub portion and also anchored to said housing for rotating said hub portion to wind the wrapper cables thereon, said means on the drum for connection with the wrapper cables including a short flexible cable having one end anchored to the drum, and a hook on the free end of the short cable for detachable connection with the loops on the wrapper cables, said short flexible cable having a length to extend to the slot to enable access thereto for connecting the wrapper cables thereto, said hook on the free end of the short cable being connectible to the housing at the slot to maintain the spring means tensioned when the wrapper cables are unwound from the drum by pulling the wrapper cables laterally through the slot.

2. The structure as defined in claim 1 wherein said slot is and defined by top and bottom edges disposed in generally parallel relation, the bottom edge of said slot including notch means engaged by said hook on the short flexible cable when the wrapper cables are unwound from the drum and by the hooks on the wrapper cables when wound onto the drum by said spring means, said notch means including a plurality of notches in the bottom edge of the slot receiving the hooks on the pluarlity of wrapper cables that are connected to the hook on the short cable and wound on the drum thereby enabling simultaneous unwinding therefrom.

* * * * *